(12) United States Patent
Thompson et al.

(10) Patent No.: US 6,785,714 B1
(45) Date of Patent: Aug. 31, 2004

(54) SYSTEM AND METHOD FOR EMPLOYING SLOT LEVEL LOCKING OF A CACHE

(75) Inventors: R. Donald Thompson, Mercer Island, WA (US); Mark T. Burton, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 103 days.

(21) Appl. No.: 09/672,728

(22) Filed: Sep. 28, 2000

(51) Int. Cl.⁷ .......................... G06F 12/00; G06F 13/00
(52) U.S. Cl. ...................... 709/213; 711/144; 711/133; 711/136; 711/159; 711/160; 711/216; 709/217
(58) Field of Search ................................ 711/144, 145, 711/133, 136, 159, 160, 216; 709/213, 217

(56) References Cited

U.S. PATENT DOCUMENTS

| | | | | | |
|---|---|---|---|---|---|
| 4,513,367 A | * | 4/1985 | Chan et al. | ................. | 711/145 |
| 4,977,498 A | * | 12/1990 | Rastegar et al. | ............ | 711/128 |
| 5,353,425 A | * | 10/1994 | Malamy et al. | ............ | 711/136 |
| 5,410,669 A | * | 4/1995 | Biggs et al. | ................. | 711/128 |
| 5,430,860 A | * | 7/1995 | Capps et al. | ................. | 711/155 |
| 5,519,846 A | * | 5/1996 | Swenson | .................... | 711/130 |
| 5,628,005 A | * | 5/1997 | Hurvig | .......................... | 707/8 |
| 5,737,751 A | * | 4/1998 | Patel et al. | .................. | 711/122 |
| 5,822,764 A | * | 10/1998 | Hardage et al. | ............ | 711/144 |
| 5,832,484 A | * | 11/1998 | Sankaran et al. | ............. | 707/8 |
| 5,835,908 A | * | 11/1998 | Bennett et al. | ............... | 707/10 |
| 5,838,940 A | * | 11/1998 | Savkar et al. | ................ | 712/200 |
| 5,875,461 A | * | 2/1999 | Lindholm | ................... | 711/118 |
| 5,913,224 A | * | 6/1999 | MacDonald | ................ | 711/125 |
| 5,974,508 A | * | 10/1999 | Maheshwari | ................ | 710/200 |
| 6,078,994 A | * | 6/2000 | Carey | .......................... | 711/133 |
| 6,092,159 A | * | 7/2000 | Ekner et al. | ................ | 711/133 |
| 6,112,281 A | * | 8/2000 | Bamford et al. | ............ | 711/141 |
| 6,145,054 A | * | 11/2000 | Mehrotra et al. | ............ | 711/119 |
| 6,282,637 B1 | * | 8/2001 | Chan et al. | .................. | 712/223 |
| 6,314,417 B1 | * | 11/2001 | Bennett et al. | ................ | 707/2 |
| 6,314,451 B1 | * | 11/2001 | Landsman et al. | .......... | 709/202 |
| 6,389,517 B1 | * | 5/2002 | Moudgal et al. | ............ | 711/146 |
| 6,493,804 B1 | * | 12/2002 | Soltis et al. | ................ | 711/152 |

FOREIGN PATENT DOCUMENTS

| EP | 1168183 A1 | * | 1/2002 | ........... G06F/12/08 |
|---|---|---|---|---|

OTHER PUBLICATIONS

Hu, W., et al., "A Lock–Based Cache Coherence Protocol for Scope Consistency," *J. of Comput. Sci. & Technol.* 13(2):97–109, 1998.

Iwai, T., and M. Nakanishi, A Spin Lock Method for Shared–Memory Architecture in Consideration of Cache Memory, *Proceedings of the 14th International Conference on Applied Informatics*, Innsbruck, Austria, Feb. 20–22, 1996, pp. 94–97.

(List continued on next page.)

*Primary Examiner*—Hong Kim
(74) *Attorney, Agent, or Firm*—Christensen O'Connor Johnson Kindness PLLC

(57) ABSTRACT

A system and method for employing slot level cache locking are disclosed. When a rich media file request occurs, a general lock is put on the cache to determine whether the file has already been allocated a location in the cache. If a location has been previously allocated, an attempt is made to lock the specific slot in the cache where the file is stored, and if successful, the general cache lock is released. In the event a slot has not been previously allocated, a next available slot is obtained and the cache slot is locked. The general lock on the cache is released. In either scenario, once the cache slot lock is achieved, the processing of the file request continues such as by requesting the file from a third party server. Additionally, upon release of the general cache lock, additional media file requests can be processed concurrently without having to wait for the continued processing of the file request.

52 Claims, 7 Drawing Sheets

OTHER PUBLICATIONS

Kawai, E., K. Osuga, K. Chinen, and S. Yamaguchi, "Duplicated Hashing Routing: A Robust Algorithm for a Distributed WWW Cache System," *IEICE Transactions of Information and Systems E83–D*(5): 1039–1047, 2000.

Kroft, D., Lockup–Free Instruction Fetch/Prefetch Cache Organization, *8th Annual Symposium on Computer Architecture*, Minneapolis, Minnesota, May 12–14, 1981, pp. 81–87.

Kurcewicz, M., W. Sylwestrzak, and A. Wierzbicki, "A Distributed WWW Cache," *Computer Networks and ISDN Systems 30*(22–23):2261–2267, 1998.

Lomet, D., "Private Locking and Distributed Cache Management," *Proceedings of the 3rd International Conference on Parallel and Distributed Information Systems*, Austin, Texas, Sep. 28–30, 1994, pp. 151–159.

Magnusson, P., et al., "Queue Locks on Cache Coherent Multiprocessors," *Proceedings of the 8th International Parallel Processing Symposium*, Cancun, Mexico, Apr. 26–29, 1994, pp. 165–171.

Povey, D., and J. Harrison, "A Distributed Internet Cache," *Australian Computer Science Communications 19*(1):175–184, 1997.

Scheurich, C., and M. Dubois, "The Design of a Lockup–Free Cache for High–Performance Multiprocessors," *Proceedings—Supercomputing '88*, Orlando, Florida, Nov. 14–18, 1988, pp. 352–359.

Tarui, T., et al., "Evaluation of the Lock Mechanism in a Snooping Cache," *ACM International Conference on Supercomputing*, Washington, DC., Jul. 19–23, 1992, pp. 53–62.

Touch, J., and A.S. Hughes, "LSAM Proxy Cache: A Multicast Distributed Virtual Cache," *Computer Networks and ISDN Systems 30*(22–23):2245–2252, 1998.

Yoshida, A., "MOWS: Distributed Web and Cache Server in JAVA," *Computer Networks and Systems 29*(8–13):965–975, 1997.

* cited by examiner

SYSTEM AND METHOD FOR EMPLOYING SLOT LEVEL LOCKING OF A CACHE

FIELD OF THE INVENTION

In general, the present application relates to computer software, and more particularly, to a system and method for employing slot level locking of a cache for storing and retrieving data.

BACKGROUND OF THE INVENTION

Generally described, networks, such as the Internet, allow computer users to request and view content provided by a variety of other computer systems on the network, commonly known as content providers. Oftentimes, a content provider receives a request for content from a client computer and returns the requested content, along with some embedded advertisement media, in the form of an Internet Web page.

Under a first approach to delivering advertisement media, instead of sending the advertisement media to the client computer, the content provider returns an identifier of the advertisement media, in the form of a network identifier. The client computer requests and obtains the media directly from another computer system on the network. In a second approach to delivering advertisement media, the advertisement media may be embodied in a format such as a rich media file whose size and complexity make their transfer from the third party computer system to the client computer inefficient or impossible. Accordingly, the content provider requests the rich media file from the third party directly and returns it to the requesting client computer when appropriate.

In general, a single content provider can service several client computers at the same time. Oftentimes, the same client computer requests the same content repeatedly, or the same content will be requested by a number of computers. As will be generally understood, repeatedly obtaining the same media file can be strenuous on the processing and communication resources of the content provider. Accordingly, content provider servers often store rich media files, or the like, in a cache for subsequent access by the same or other client computer.

In one conventional multi-threaded content provider server environment, each client computer request for a media file is embodied as a single thread, which is processed in sequential order by the content provider. Under this system, upon accepting a media file request thread, the entire content provider cache, is locked to determine whether a copy of the media file is in the cache. If the media file is not in the cache, the content provider places a call to a third party server to retrieve the media file. The cache remains locked during the file retrieval process, and any subsequent thread file requests remain idle until the cache lock is removed.

With reference to the above example, the conventional system becomes inefficient in the event a call for a media file is delayed or lost in the network. In such an event, because the content provider is waiting for the media file, the cache remains locked for an extended period of time, often indefinitely. Accordingly, every additional media file request threads remain idle while the server waits. Eventually, prolonged delays result in a content provider server failure.

Thus, there is a need for a system and method utilizing localized cache slot locks to facilitate multi-threaded file requests.

SUMMARY OF THE INVENTION

In accordance with this invention, a system and method for enabling slot level cache locking are provided. A rich media file request is obtained and a general lock is put on the cache to determine whether the file has already been allocated a location in the cache. If a location has been previously allocated, an attempt is made to lock the specific slot in the cache where the file is stored, and if successful, the general cache lock is released. In the event a slot has not been previously allocated, a next available slot is obtained and the cache slot is locked. Thereafter, the general lock on the cache is released. In either scenario, once the cache slot lock is achieved, the processing of the file continues, such as requesting the file from a third party. Additionally, upon the release of general cache lock, additional media file requests can be processed concurrently without having to wait for the continued processing of the previous file request.

In accordance with other aspects of the present invention, a computer implementable method for retrieving data from a cache having at least one cache slot for storing data is provided. When a request for data occurs, a cache slot for the data is allocated if a cache slot has not been previously allocated. The cache slot is locked prior to retrieving the data. The requested data is retrieved and stored in the allocated cache slot. Thereafter, the cache slot lock is released and the data is returned.

In accordance with another aspect of the present invention, a computer system for returning requested data is provided. The computer system includes at least one browser application operable to request data and a content provider server having at least one cache slot for storing data. The content provider server receives data requests from the browser application and allocates a cache slot for each data request from the browser application. The allocated cache slot is locked while the content provider server obtains the requested data.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

Figure 7:
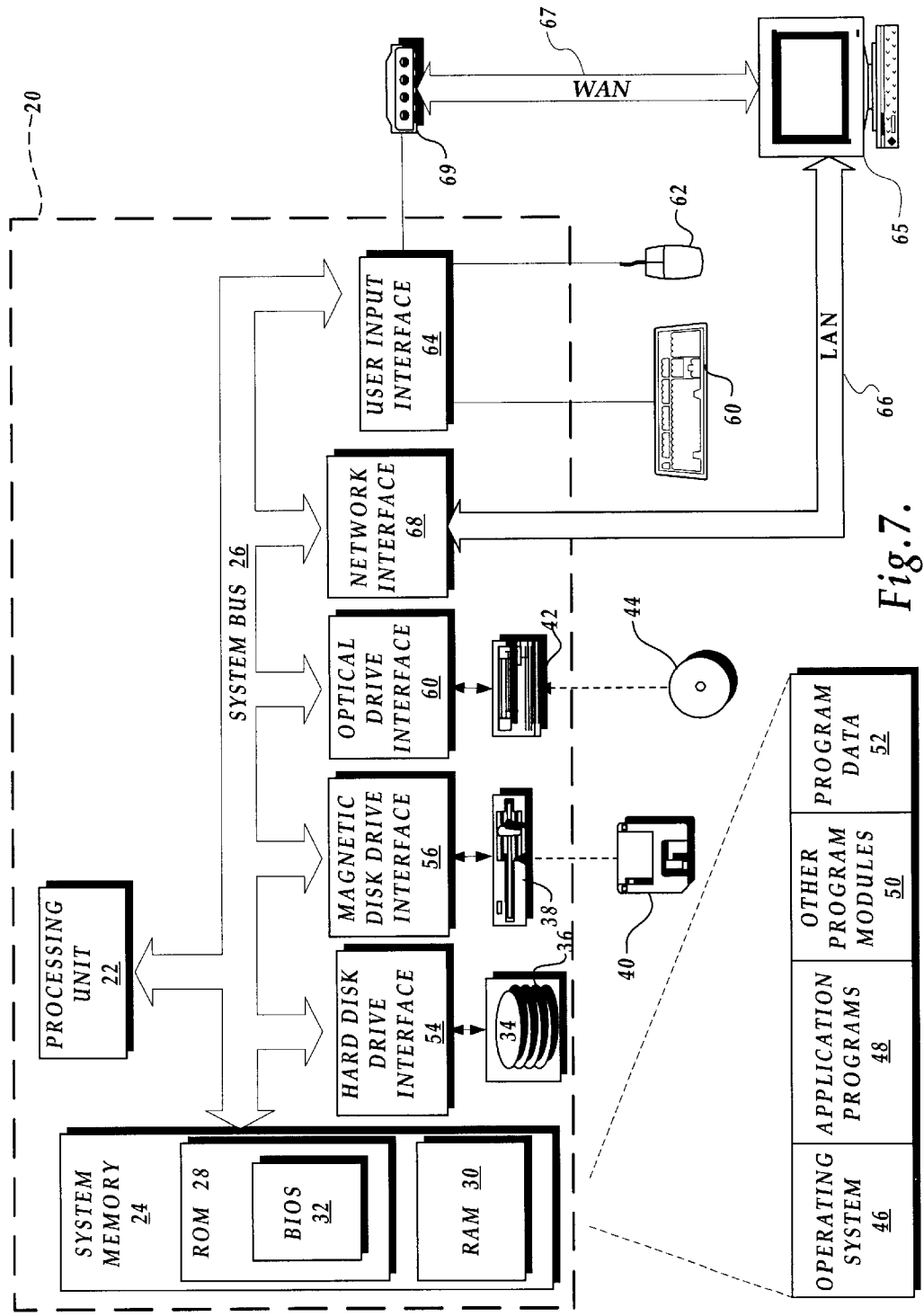
FIG. 7 is a block diagram of a suitable computer environment in accordance with the present invention.

FIG. 7 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purpose or special computing system environments or configurations. Example of well known computing systems, environments, and/or configurations that may be suitable for implementing the invention include, but are not limited to personal computers, server computers, laptop devices, multiprocessor systems, microprocessor-based systems, network PCs, minicomputers, mainframe computers, distributed computing environments that include any of the above systems or the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 20. Components of a computer 20 include, but are not limited to, a processing unit 22, a system memory 24, and a system bus 26 that couples various system components including the system memory to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 12 illustrates an operating system 46, application programs 48, other program modules 50, and program data 52.

The computer 20 may also include removable/non-removable, volatile/non-volatile computer storage media. By way of example only, FIG. 7 illustrates a hard disk drive 36 that reads from or writes to non-removable, non-volatile magnetic media 38, a magnetic drive 38 that reads from or writes to a removable, non-volatile magnetic disk 40, and an optical disk drive 42 that reads from or writes to a removal, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 26 by a hard disk drive interface 54, a magnetic disk drive interface 56, and an optical drive interface 58, respectively. Alternatively, the hard disk drive 34, magnetic disk drive 38, and optical disk drive 42 are typically connected to the system bus 26 by a Small Computer System Interface (SCSI).

The drives and their associate computer storage media discussed above and illustrated in FIG. 7, provide storage of computer-readable instructions, data structures, program modules and other data for the computer 20. In FIG. 7, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 7. The logical connections depicted in FIG. 7 include a local area network (LAN) 66 and a wide area network (WAN) 67, but also include other networks. Such network environments are commonplace in office, enterprise-wide computer networks, intranets, and the Internet.

When used in a LAN network environment, the computer 20 is connected to the LAN 66 through a network interface adapter 68. When used in a WAN network environment, the computer typically includes a modem or other means for establishing communications over the WAN 68, such as the Internet. The modem, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 7 illustrates remote application programs 48 as residing on memory device 24. It will be appreciated that the network connections shown are exemplary in other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM instructs the processing unit 22 to loan the operating system from the hard disk drive 34 into the RAM 30. Once the operating system 46 is loaded into RAM 30, the processing unit executes the operating system code and causes the visual elements associated with the user interface of the operating system to be displayed on the monitor 61. When an application program 48 is opened by a user, the program code and relevant data are read from the hard disk drive and stored in RAM 38.

As is appreciated by those skilled in the art, the World Wide Web (WWW) is a vast collection of interconnected or "hypertext" documents written in HyperText Markup Language (HTML) or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks that may be identified in various way (e.g., highlighted portions of text) which link the document to other hypertext documents possibly stored at a WWW site elsewhere on the Internet. Each hyperlink is associated with a Uniform Resource Locator (URL) and provides the exact location of the linked document on a server connected to the Internet and describes the document. Thus, whenever a hypertext document is retrieved from any WWW server, the document is considered to be retrieved from the WWW. As is known to those skilled in the art, a WWW server may also includes facilities for storing and transmitting application programs, which is application programs written in the JAVA™ programming language from Sun Microsystems, for execution on a remote computer. Likewise WWW server may also include facilities for executing scripts or other application programs on the WWW server itself.

A consumer or other remote user may retrieve hypertext documents from the WWW via a WWW browser application program. The WWW browser is a software application program for providing a graphical user interface to the WWW. Upon request from the consumer via the WWW browser, the browser accesses and retrieves the desired hypertext document from the appropriate WWW server using the URL for the document and a protocol known as a HyperText Transfer Protocol (HTTP). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA™ applets, for execution on the client computer.

The present application relates to a system and method for facilitating the processing of data file requests by a server system. Specifically, the present invention will be described in relation to a system and method for processing and delivering rich media advertisement data. As will be readily understood by one skilled in the relevant art, the present invention is not limited in its application to an advertisement media delivery system. Thus, it is to be understood that the disclosed embodiment is only by way of example and should not be construed as limiting.

Figure 1:
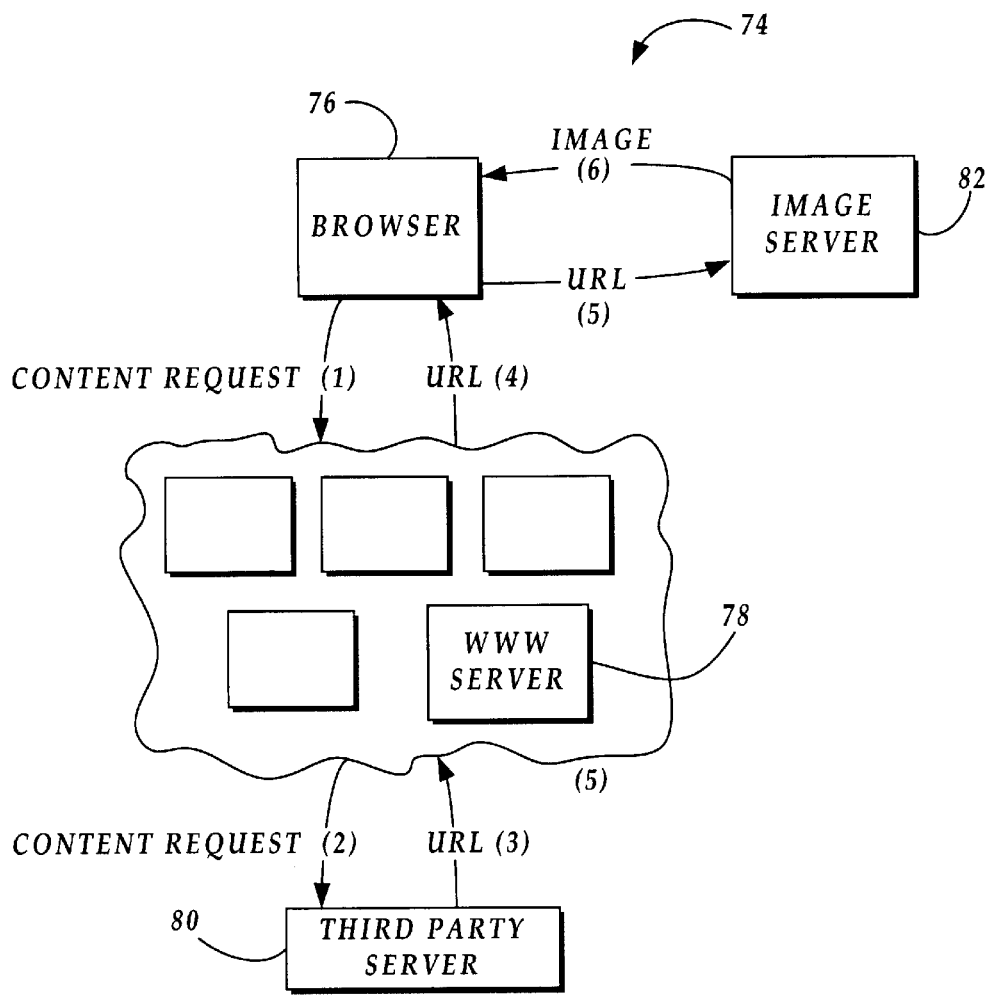
FIG. 1 is a block diagram illustrative of a first content delivery system for processing and delivering data in response to requests.

FIG. 1 is a block diagram illustrative of a first type of networked system 74 for processing data requests. The system 74 includes a browser application 76, which sends content requests to a content provider 78. The content provider 78 is typically a content server, which generates a portion of a content to be delivered to the browser application 76. The content server 78 also acquires a portion of the content, such as advertisement media, from a third party server 80, which returns the data to the content provider 78. In this embodiment, the third party server 80 returns a URL associated with the advertisement media to the content provider 78 to be delivered to the browser application 76. In turn, the content server 78 passes the URL to the browser application 76. The browser application 76 then requests the image data from an image server 82 and displays the advertisement media along with the content provided by the content server 78. As will be readily understood by one skilled in the relevant art, the image server 82 and third party server 80 may be the same or separate computer systems.

Figure 2:
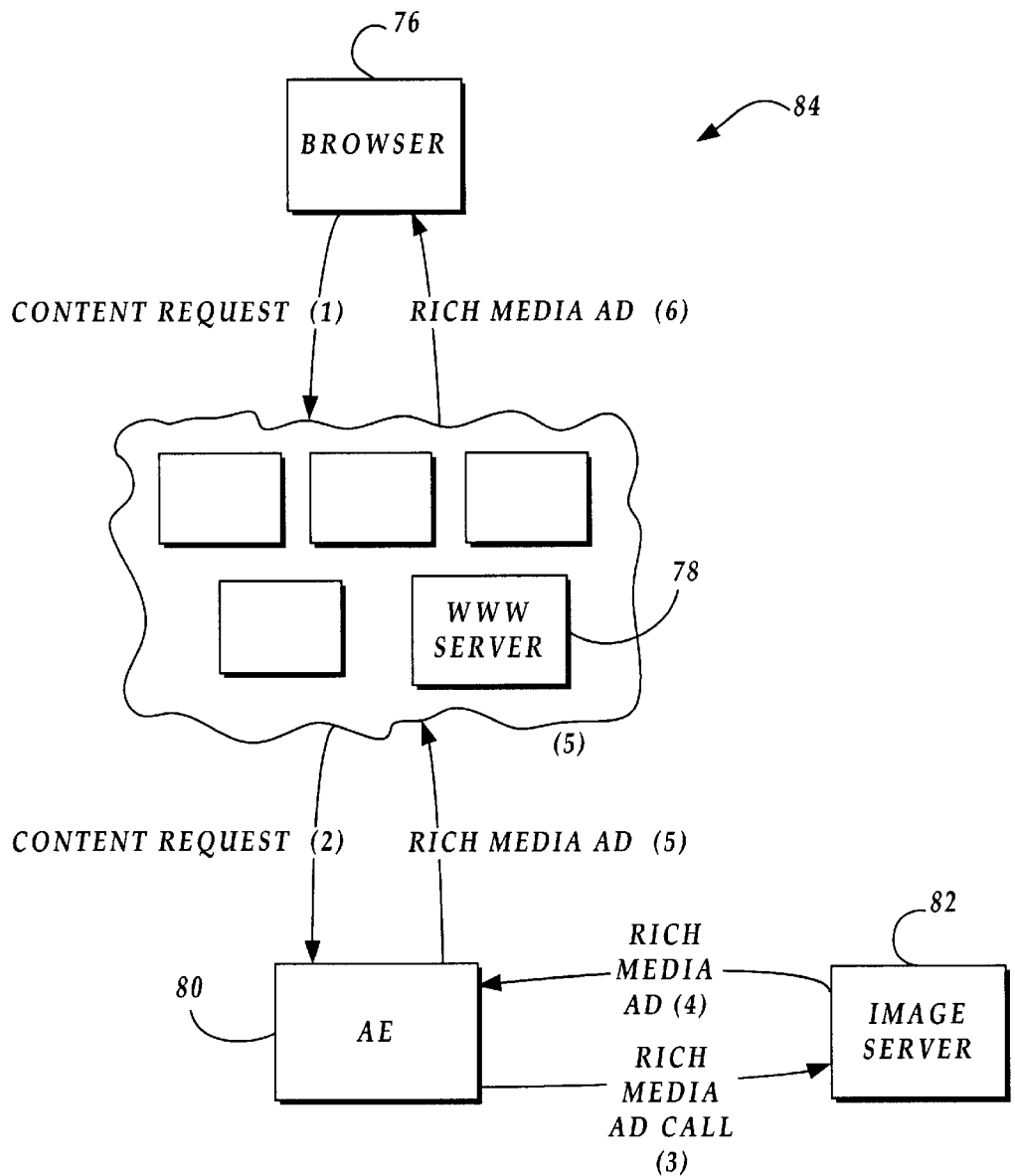
FIG. 2 is a block diagram illustrative of a second content delivery system for processing and delivering data in response to requests.

FIG. 2 is a block diagram illustrative of a second type of networked system 84 for processing data requests. Similar to the first type of networked system 74, the browser application 76 sends a contents request to the content server 78. In turn, the content server 78 sends the content request to a third party server 80. The third party server 80 requests the image data from an image server 82 and returns it to the content server 78. Alternatively, the content server may request the image file directly from the image server, or the third party server 80 may provide the rich media file directly to the content provider 78. The content server 78 then provides the browser application 76 with the rich media file. As will be readily understood by one skilled in the relevant art, the rich media files may be of a complexity such that their processing and transfer deplete both the processing and communications resources of the content server 78.

Figure 3:
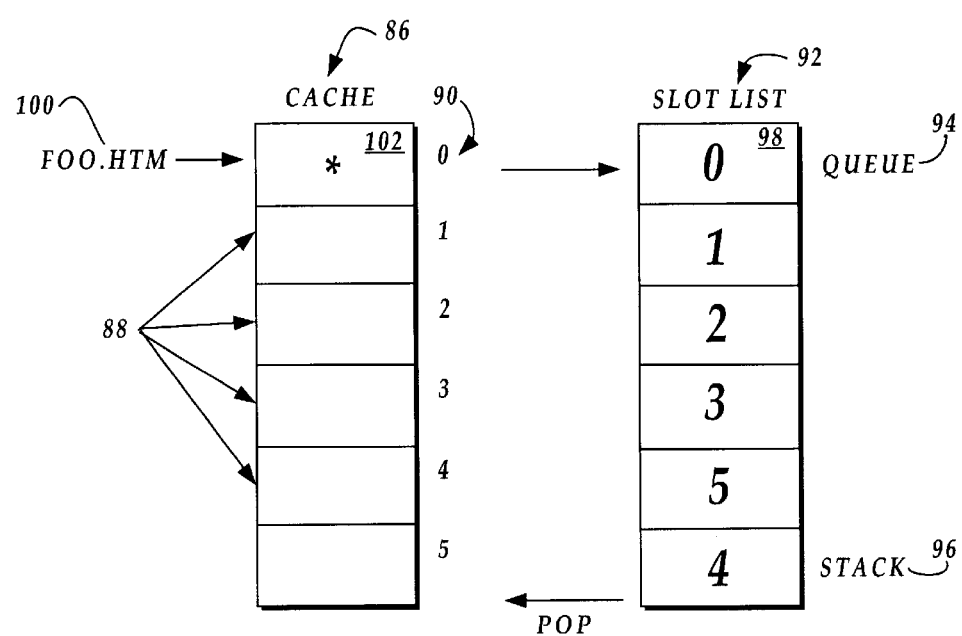
FIG. 3 is a block diagram illustrative of a cache hash table in accordance with the present invention.

To mitigate the depletion of its processing and communication resources, the content server 78 incorporates a cache for retrieving and storing media files locally. Preferably, the content server 78 utilizes a cache hash table for storing the data. FIG. 3 is a block diagram illustrative of a cache hash table 86 architecture in accordance with the present invention. The cache hash table 86 includes a plurality of cache slots 88, which correspond to numerical hash keys 90. It will be apparent to one skilled in the relevant art that hash table data structures utilizing hash keys are commonly known. In general, a hashing algorithm converts data identifiers into numeric values for location in a data structure, such as a table. As will be readily understood by one skilled in the relevant art, any one of a variety of hashing algorithms may be utilized when practicing the present invention to generate the numerical hash keys from the data. Additionally, alternative data structures other than a hash table may also be employed to store and recall the hashed data.

The cache hash table 86 is also associated with a slot list 92, which serves as a most recently used queue 94 from a first end and a next available slot stack 96 from the other end. The element at the top of the slot list 92 corresponds to the first element in the most recently used queue 94. Likewise, the element at the bottom of the slot list 92 corresponds to the first element in the next available slot stack 96. The slot list 92 contains the same number of elements, or entries, as there are slots 88 in the cache hash table 92. In this illustrative embodiment of the invention, the top most element 98 in the slot list corresponds to the top element of the most recently used queue 94 and would also be the last element of the next available slot of the next available slot stack 96.

In an actual embodiment of the invention, the slot list 92 is a dynamic structure that varies the order of the elements to reflect the use of corresponding slots 88 in the cache hash table 86. With reference to FIG. 3, data 100, "FOO.HTM", corresponds to hash key of "0". Assuming that hash table location 102, corresponding to hash key "0", was the most recently used cache slot 88, slot list element 98 indicates that slot 102 is at the top of the most recently used queue 94. As will be understood by one skilled in the relevant art, the slot list 92 may be broken into two separate lists and/or different data structures.

Figure 4:
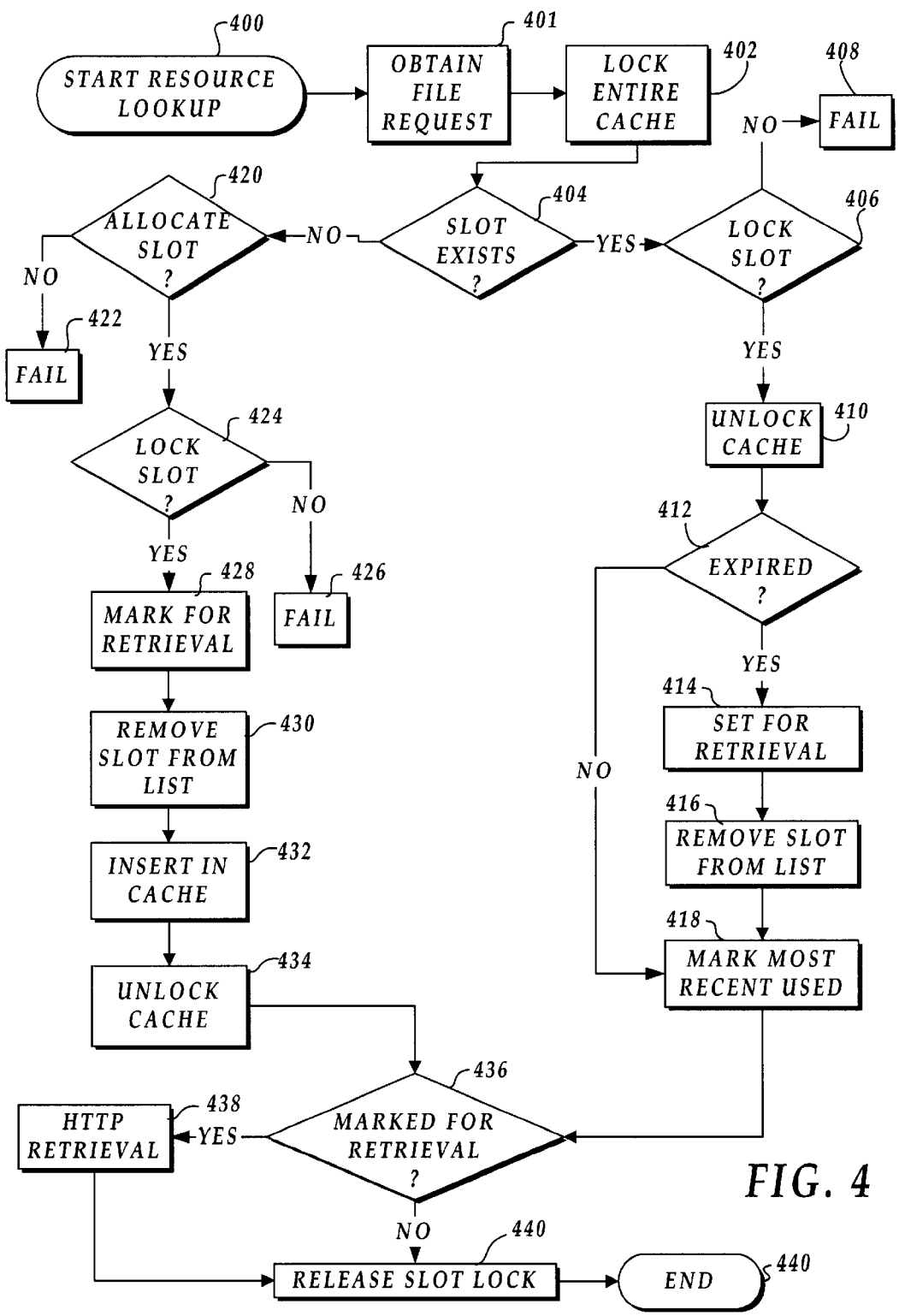
FIG. 4 is a flow diagram illustrative of a media file request processing routine in accordance with the present invention.

FIG. 4 is a flow diagram illustrative of a media file request processing routine 400 implemented by a content provider 78 utilizing a cache hash table 86 in accordance with the present invention. At block 401, a request for a file is obtained. At block 402, the general cache 86 (FIG. 3) is locked. In an actual embodiment, the locking of the cache 86 prohibits any request thread from reading from or writing to the cache 86. At decision block 404, a test is done to determine whether a slot 88 corresponding to the media file request already exists.

In an actual embodiment of the invention, each request from the browser application 76 for a data file includes data relating to the content requested, the user profile and/or the browser application 76 utilized to access the data. For example, some data includes a computer Internet protocol (IP) address or a graphical user ID (GUID). The advertisement events server 82 utilizes the information provided by the browser application 76 to determine what advertisement media should be delivered to the browser application 76. The advertisement events server 82 returns a media file identifier, such as a file name or file address, to the content server 78. Alternatively, the content server 78 may utilize the browser application information to determine what advertisement media should be delivered. As will be explained in detail below, the content server 78 will determine whether it has an unexpired copy of the identified media file prior to attempting to obtain the file from an external source.

The media file identifier is converted by a hashing algorithmic method into a hash key. Accordingly, the test at decision block 404 to determine whether a slot 88 exists can include determining whether the hash key matches with a currently stored hash key in memory. Additionally, the test further includes comparing some or all of the raw data (e.g., full file name) used to generate the hash key of the media file request with the raw data utilized to generate the hash key for the stored data to ensure that request for the data matches the data stored. As will be generally understood by one skilled in the relevant art that a hashing algorithm may generate the same hash key for two distinct pieces of data, commonly referred to a hash key collision. Accordingly, the additional test mitigates the potential for hash key collision errors, but may be modified or eliminated.

If a previously allocated slot 88 exists, an attempt to lock the allocated cache slot 88 is made at decision block 406. In an actual embodiment of the invention, the locking of a slot 88 is accomplished by setting one or more flags, or fields, indicating that no process can read from or write to that particular slot 88 in the cache 86 until the flag is cleared. Each slot 88 may contain its own lock status indicator and/or the content provider 78 may include one or more centralized data structures, such as a table, containing lock status indicators for all of the cache slots 88. As will be readily understood by one skilled in the art, alternative methods of locking slots, such as multiple fields or indicators, are considered to be within the scope of the present invention.

If the attempt to lock the slot is unsuccessful, the process fails at block 408. In an actual embodiment, the attempt to lock the slot is limited to a defined period of time, such as 40 milliseconds. If the attempt to lock the slot is not successful within the time period, the locking process is considered to fail. As will be readily understood, varying waiting time period amounts, or multiple slot locking attempts before indicating a failure may also be utilized. It will be appreciated by one skilled in the art that because the entire cache 86 is locked during the attempt to lock the slot 88, a shorter waiting period at block 404 mitigates bottlenecks created while the slot locking is attempted.

If the cache slot lock is successful, the entire cache lock is released at block 410. At decision block 412, a test is made to determine whether the data within the locked cache slot is expired. If the data is expired, at block 414, the data is marked for retrieval and the cache slot identifier is removed from the slot list 92 at block 416. In an actual embodiment, the actual data element, such as the media file, within the cache may expire. For example, a data element may include a time limit indicator for the data to be presumed valid. Additionally, the cache 86 may implement internal time keeping methods to consider any data after a certain period to be expired. In the event a data element is expired, marking the slot for retrieval allows a new copy of the media file to replace the expired copy.

If the data is not expired at block 412, or upon completion of the removal of the slot from the slot list 92 at block 416, the cache slot 88 is marked most recently used at block 418. In an actual embodiment of the invention, the cache slot is marked most recently used by inserting the cache slot identifier as the first element in the most recently used queue 94 of the slot list 92. The removal of the cache slot identifier from the slot list 92 and its reinsertion as the top element in the most recently used queue 94 reflects the dynamic nature of the slot list 92. Thereafter, the data is further processed at block 436, which will be explained in greater detail below.

Returning to decision block 404, if a cache slot has not been previously allocated, at decision block 420, a test is made to determine whether a cache slot can be allocated. In an actual embodiment, the cache 86 requests the next available cache slot from the next available slot stack 96. If a cache slot is unavailable, the allocation fails at block 420 and the routine 400 terminates at block 422. However, if a cache slot is available, at decision block 424, an attempt is made to lock the slot. As described above, in an actual embodiment, the attempt to lock the slot is limited to a defined period of time, such as 40 milliseconds. If the attempt to lock the slot is not successful within the time period, the locking process is considered to fail at block 426. If the attempt to lock the slot is successful, at block 428 the slot is marked for retrieval.

Once the slot is marked for retrieval, at block 430, the cache slot is removed from the slot list 92 and marked most recently used at block 432 in a manner described above with respect to block 418. At block 434, the general cache lock is released. The present invention facilitates the concurrent processing of multiple request threads by allowing a cache slot to be allocated, locked and inserted in cache prior to processing the data. Accordingly, by releasing the cache lock at block 434 or at block 410 (after locking the allocated cache slot), subsequent media file request threads are processed in a manner illustrated by routine 400 without having to wait until the processing of the current media file request is finished.

Upon a slot being marked most recently used at block 418 or upon the unlocking of the cache lock at block 434, the process cycles to decision block 436 where a test is done to determine whether the allocated and locked slot is marked for retrieval. If the slot is marked for retrieval at block 438, a HTTP retrieval is initiated to request and obtain the file from a third-party server 88. If the file is not marked for retrieval or upon completion of file retrieval, the slot locked is released at block 440 and the routine 400 terminates at block 442. Accordingly, if the cache slot has been previously allocated and not marked for retrieval, the slot locked can be released immediately. Alternatively, if the allocated slot data is expired or a new slot has been allocated, the media file is obtained and then the slot locked is released.

Figure 5:
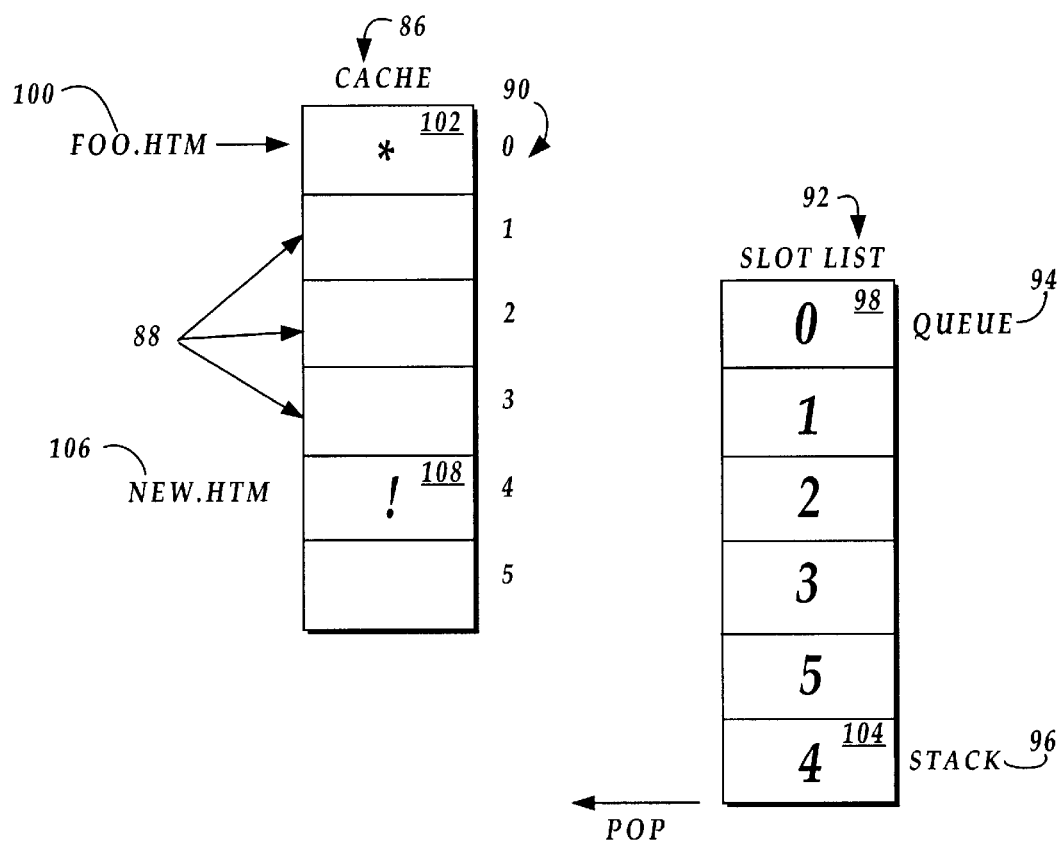
FIG. 5 is a block diagram of the cache hash table of FIG. 3 illustrating the insertion of data into one of the cache slots.

FIG. 5 is a block diagram of the cache of FIG. 3 illustrating the allocation of a slot 88 and the insertion of a data identifier 106, "NEW.HTM", and its corresponding data, into the newly allocated slot. As explained above, a slot is allocated by retrieving an identifier of the next available slot from the next available slot stack 96. In the illustrative embodiment of FIG. 5, the next available slot stack 96 indicates at element 104 that the next available slot corresponds to the hash key of "4". Accordingly, data 106 is inserted into cache table location 108, which corresponds to hash table key "4".

Figure 6:
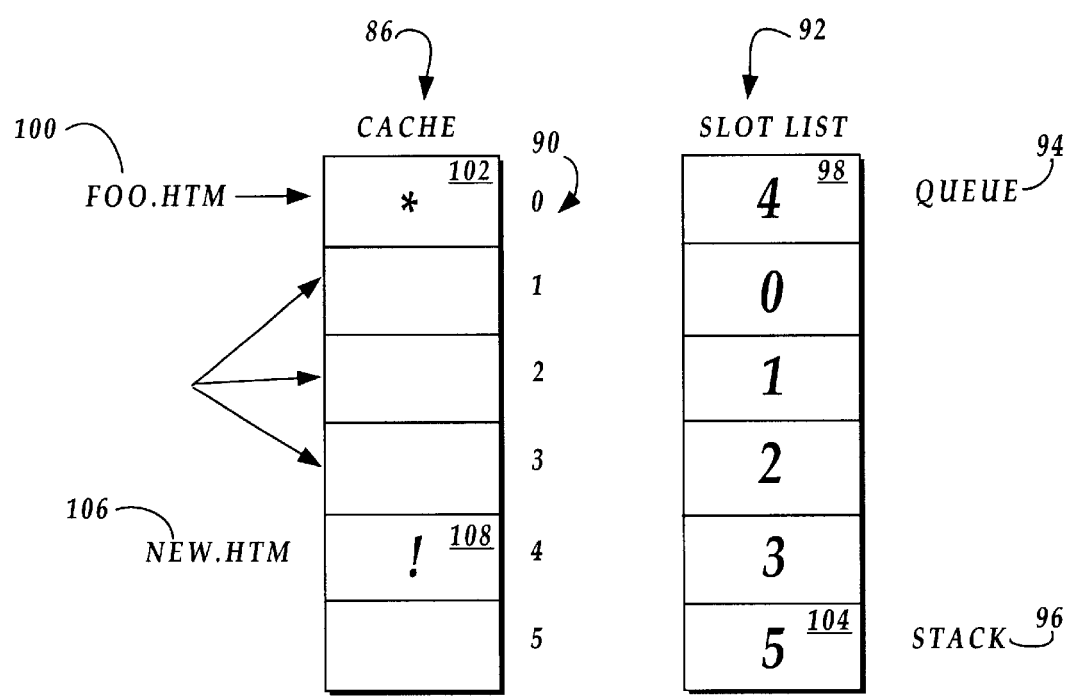
FIG. 6 is a block diagram of the cache hash table of FIG. 3 illustrating the order of a queue with respect to the insertion of data into the cache slot in accordance with the present invention.

Because slot location 108 contains new data, the identifier of the slot is removed as the top element of the next available slot stack 96. Additionally, the slot identifier is marked most recently used by making it the first element in most recently used slot queue 94. FIG. 6 illustrates the contents of the cache hash table 86 and the slot list 92 after the insertion of the data 106. In the illustrative embodiment, slot list element 98, now containing an identifier to hash key "4", indicates that it is the most recently used slot 88. Additionally, slot list element 104, now containing an identifier to a hash key of "5", indicates that this slot is the next available slot 88.

By utilizing cache slot locking, the present invention facilitates the concurrent processing of file requests by a cache server. Additionally, by releasing the general cache lock prior to completing the processing of the file request, the present invention mitigates cache server failure if the file request is lost or delayed.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. In a content delivery system having a content provider and a communication network, wherein the content provider obtains data via the communication network and processes data requests over the communication network, a method for retrieving data from a cache corresponding to a data request, wherein the cache includes at least one cache slot for storing data, the method comprising:
   obtaining a request for data from the communication network;
   allocating a cache slot for the data if a cache slot has not been previously allocated;
      wherein allocating a cache slot for the data if a cache slot has not been previously allocated includes:
         obtaining a file identifier corresponding to the requested data;
         generating a hash key corresponding to the file identifier, and
         determining whether the generated hash key matches a hash key in an existing cache slot;
   locking the allocated cache slot prior to retrieving the data from the communication network;
   obtaining the requested data from the communication network;
   storing the requested data in the allotted cache slot;
   releasing the cache slot lock; and
   transmitting the requested data over the communication network.

2. The method as recited in claim 1, further comprising marking the allocated cache slot for retrieval upon locking the allocated cache slot.

3. The method as recited in claim 2, wherein the step of obtaining the data is performed only if the allocated cache slot is marked for retrieval.

4. The method as recited in claim 1, wherein the step of allocating the cache slot includes:
   obtaining an available cache slot location from an available cache slot queue; and
   removing the cache slot location from the available cache slot queue upon the successful allocation of a cache slot.

5. The method as recited in claim 1, further comprising locking the entire cache prior to allocating a cache slot for the data.

6. The method as recited in claim 5 further comprising unlocking the entire cache upon locking the allocated cache slot.

7. The method as recited in claim 5 flier comprising unlocking the entire cache if a cache slot has previously been allocated.

8. The method as recited in claim 1, further comprising if a cache slot has been previously allocated, locking the allocated cache slot.

9. The method as recited in claim 8 further comprising marking the previously allocated cache slot for retrieval if data within the previously allocated cache slot is expired.

10. The method as recited in claim 9 further comprising marking the previously allocated cache slot as most recently used.

11. The method as recited in claim 10, wherein marking the previously allocated cache slot as most recently used includes:
    removing the previously allocated cache slot location from a most recently used queue; and
    entering the previously allocated cache slot location at the beginning of the most recently used queue.

12. The method as recited in claim 1, further comprising:
    obtaining a second request for data; and
    allocating a second cache slot for the data if a cache slot has not been previously assigned;
    wherein the step of allocating a second cache slot is processed concurrently with the step of obtaining the requested data.

13. The method as recited in claim 1, wherein the data is rich media data.

14. The method as recited in claim 1, wherein the data is rich media advertisement data.

15. The method as recited in claim 1, wherein the computer system is a multi-threaded content provider server, and wherein the request for data is embodied as a single thread.

16. The method as recited in claim 1, wherein obtaining the requested data includes obtaining the data from an external component in the communication network.

17. The method as recited in claim 1, wherein the computer system is a multi-threaded content provider, and wherein the request for data is embodied as a single thread.

18. A computer system for distributing data via a communication network, the computer system comprising:
    at least one client for requesting data over the communication network; and
    a content provider, wherein the content provider includes a cache with at least one cache slot for storing data and wherein the content provider receives data requests from the client via the communication network;
    wherein the content provider allocates a cache slot for each data request from the client and wherein the allocated cache slot is locked while the content provider obtains the requested data across the communication network; and wherein allocating a cache slot for the data if a cache slot has not been previously allocated includes:
        obtaining a file identifier corresponding to the requested data;
        generating a hash key corresponding to the file identifier; and
        determining whether the generated hash key matches a hash key in an existing cache slot.

19. The system as recited in claim 18 further comprising a data server for storing and providing data to the content provider server.

20. The system as recited in claim 18, wherein the data is a rich media file.

21. The system as recited in claim 20, wherein the data is a rich media advertisement file.

22. The computer system as recited in claim 18 further comprising two or more browser applications operable for requesting data, wherein each browser application request for data is embodied as a single thread in the content provider server.

23. The system as recited in claim 18 further comprising a third party data provider for delivering the requested data to the content provider via the communication network, wherein the content provider requests the requested data from the third party data provider when the allocated cache slot is locked.

24. In a content delivery system having a content provider and a communication network, wherein the content provider obtains data via the communication network and processes data requests over the communication network, a computer-readable medium having computer executable instructions for retrieving data from a cache corresponding to a data request, wherein the cache includes at least one cache slot for storing data, the method comprising:
    obtaining a request for data over the communication network;
    allocating a cache slot for the data if a cache slot has not been previously allocated;
        wherein allocating a cache slot for the data if a cache slot has not been previously allocated includes:
            obtaining a file identifier corresponding to the requested data;
            generating a hash key corresponding to the file identifier; and
            determining whether the generated hash key matches a hash key in an existing cache slot;
    locking the allocated cache slot prior to retrieving the data from the communication network;
    obtaining the requested data from the communication network;
    storing the requested data in the allotted cache slot;
    releasing the cache slot lock; and
    transmitting the request data over the communication network.

25. The computer-readable medium as recited in claim 24 further comprising marking the allocated cache slot for retrieval upon locking the allocated cache slot.

26. The computer-readable medium as recited in claim 25, wherein the step of obtaining the data is performed only if allocated cache slot is marked for retrieval.

27. The computer-readable medium as recited in claim 24, wherein the step of allocating the cache slot includes:
    obtaining an available cache slot location from an available cache slot queue; and
    removing the cache slot location from the available cache slot queue upon the successful allocation of a cache slot.

28. The computer-readable medium as recited in claim 24 further comprising locking the entire cache prior to allocating a cache slot for the data.

29. The computer-readable medium as recited in claim 28 further comprising unlocking the entire cache upon locking the allocated cache slot.

30. The computer-readable medium as recited in claim 28 further comprising unlocking the entire cache if a cache slot has previously been allocated.

31. The computer-readable medium as recited in claim 24 further comprising if a cache slot has been previously allocated, locking the allocated cache slot.

32. The computer-readable medium as recited in claim 31 further comprising marking the previously allocated cache slot for retrieval if data within the previously allocated cache slot is expired.

33. The computer-readable medium as recited in claim 32 further comprising marking the previously allocated cache slot as most recently used.

34. The computer-readable medium as recited in claim 33, wherein marking the previously allocated cache slot as most recently used includes:
    removing the previously allocated cache slot location from a most recently used queue; and entering the previously allocated cache slot location at the beginning of the most recently used queue.

35. The computer-readable medium as recited in claim 24 further comprising:
   obtaining a second request for data; and
   allocating a second cache slot for the data if a cache slot has not been previously assigned;
   wherein the step of allocating a second cache slot is processed concurrently with the step of obtaining the requested data.

36. The computer-readable medium as recited in claim 24, wherein the data is rich media data.

37. The computer-readable medium as recited in claim 24, wherein the data is rich media advertisement data.

38. In a content delivery system having a content provider and a communication network, wherein the content provider obtains data via the communication network and processes data requests over the communication network, a computer system having a processor, a memory and an operating environment, the computer system for retrieving data from a cache corresponding to a data request, wherein the cache includes at least one cache slot for storing data, the computer system operable to perform:
   obtaining a request for data over the communication network;
   allocating a cache slot for the data if a cache slot has not been previously allocated;
   wherein allocating a cache slot for the data if a cache slot has not been previously allocated includes:
      obtaining a file identifier corresponding to the requested data;
      generating a hash key corresponding to the file identifier; and
      determining whether the generated hash key matches a hash key in an existing cache slot:
   locking the allocated cache slot prior to retrieving the data from the communication network;
   obtaining the requested data from the communication network;
   storing the requested data in the allotted cache slot;
   releasing the cache slot lock; and
   transmitting the request data over the communication network.

39. The computer-readable medium as recited in claim 38 further comprising marking the allocated cache slot for retrieval upon locking the allocated cache slot.

40. The computer system as recited in claim 38, wherein the step of obtaining the data is performed only if allocated cache slot is marked for retrieval.

41. The computer system as recited in claim 38, wherein the step of allocating the cache slot includes:
   obtaining an available cache slot location from an available cache slot queue; and
   removing the cache slot location from the available cache slot queue upon the successful allocation of a cache slot.

42. The computer system as recited in claim 38 further comprising locking the entire cache prior to allocating a cache slot for the data.

43. The computer system as recited in claim 42 further comprising unlocking the entire cache upon locking the allocated cache slot.

44. The computer system as recited in claim 42 further comprising unlocking the entire cache if a cache slot has previously been allocated.

45. The computer system as recited in claim 38 further comprising if a cache slot has been previously allocated, locking the allocated cache slot.

46. The computer system as recited in claim 45 further comprising marking the previously allocated cache slot for retrieval if data within the previously allocated cache slot is expired.

47. The computer system as recited in claim 46 further comprising marking the previously allocated cache slot as most recently used.

48. The computer system as recited in claim 47, wherein marking the previously allocated cache slot as most recently used includes:
   removing the previously allocated cache slot location from a most recently used queue; and
   entering the previously allocated cache slot location at the beginning of the most recently used queue.

49. The computer system as recited in claim 38 further comprising:
   obtaining a second request for data; and
   allocating a second cache slot for the data if a cache slot has not been previously assigned;
   wherein the step of allocating a second cache slot is processed concurrently with the step of obtaining the requested data.

50. The method as recited in claim 38, wherein the data is rich media data.

51. The method as recited in claim 38, wherein the data is rich media advertisement data.

52. The method as recited in claim 38, wherein the computer system is a multi-threaded content provider, and wherein the request for data is embodied as a single thread.

* * * * *